(12) United States Patent
Fujiki et al.

(10) Patent No.: US 6,770,690 B2
(45) Date of Patent: Aug. 3, 2004

(54) SILICONE RUBBER COMPOSITIONS FOR RUBBER CONSTRUCTION MATERIALS

(75) Inventors: Hironao Fujiki, Gunma-ken (JP); Tsuneo Kimura, Gunma-ken (JP); Tadashi Araki, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 10/263,765

(22) Filed: Oct. 4, 2002

(65) Prior Publication Data

US 2003/0119975 A1 Jun. 26, 2003

(30) Foreign Application Priority Data

Oct. 5, 2001 (JP) ........................................ 2001-309747

(51) Int. Cl.$^7$ ................................................. C08K 3/22
(52) U.S. Cl. ........................ 523/205; 523/209; 523/212; 524/588; 524/432; 524/431
(58) Field of Search ................................. 523/205, 209, 523/212; 524/588, 431, 432

(56) References Cited

U.S. PATENT DOCUMENTS 5,616,532 A    4/1997    Heller et al.

6,407,156 B1 * 6/2002 Hagihara et al. ........... 524/494

FOREIGN PATENT DOCUMENTS

| EP | 0 857 770 A2 | 8/1998 |
|---|---|---|
| JP | 9-227779 | 9/1997 |

\* cited by examiner

*Primary Examiner*—Margaret G. Moore
(74) *Attorney, Agent, or Firm*—Birch, Stewart, Kolasch & Birch, LLP.

(57) ABSTRACT

A silicone rubber composition for use in rubber construction materials contains dispersed particles having a photocatalytic activity. The particles are surface-treated with a compound that can easily be deteriorated by the photocatalytic activity under outdoor exposure to ultraviolet light. Rubber construction materials made of the cured form of the composition, when exposed to ultraviolet light, undergo surface hydrophilization that endows them with excellent stain resistance, and also have excellent sealing properties. When the composition is applied as a coating, filled into joints, or used as a solid gasket, it does not cause staining of the building, joints, or the area around joints.

9 Claims, No Drawings

SILICONE RUBBER COMPOSITIONS FOR RUBBER CONSTRUCTION MATERIALS

This nonprovisional application claims priority under 35 U.S.C. § 119(a) on Patent Application No. 2001-309747 filed in JAPAN on Oct. 5, 2001, which is herein incorporated by reference.

BACKGROUND OF THE INVENTION

1. Field of the Invention

The present invention relates to silicone rubber compositions for use in rubber construction materials such as sealants, coatings and gaskets.

2. Prior Art

Synthetic rubber sealants are commonly used to fill concrete joints, joints in window and door sashes, and around the edge of glass panels in buildings and other structures. A variety of such sealants are known, including silicone, polysulfide, polyurethane, acrylic rubber, styrene-butadiene rubber (SBR) and butyl rubber sealants. Of these, condensation-curing silicone sealants are widely used on account of their adhesive properties, heat and weather resistance, and durability. Solid gaskets used in construction are often made of peroxide-vulcanized silicone. In addition, techniques have recently been disclosed for overcoating peroxide-vulcanized silicone gaskets with a UV-curable silicone coating, and for fabricating gaskets integral to glass by placing a mold over the glass, pouring a platinum-catalyzed addition-curing silicone rubber composition into the mold, then curing the composition and bonding it to the glass.

However, one problem associated with the silicone sealants and gaskets used until now in exterior wall joints has been the spread of stains near the joints. This depends to a large extent on the site conditions (external environment, orientation) of the building and the joint design (shape, adhesion substrate), and has generally been found to correlate closely with the degree of air pollution around the building, the manner in which rainwater flows down over the building, and the degree of dryness after a rainfall. Solutions to prevent staining include changing the design of the joint to one which does not come into direct contact with rain, such as a hidden joint or a recessed joint, and using a coating to create a barrier on the surface of the sealant after it has cured or on the surface of the gasket. The former approach entails changes in the design specifications, leaving problems to be resolved with the decorative details of the building, whereas the latter approach requires the addition of a coating operation that increases overall construction costs. For these reasons, neither approach is in common use today.

We earlier disclosed that, when a rubber construction material such as a sealant, coating or gasket is made of the cured form of a silicone rubber composition containing dispersed particles having a photocatalytic activity, such as titanium oxide or zinc oxide, exposure to ultraviolet light modifies the surface, rendering it hydrophilic and non-staining (JP-A 9-227779). Yet, although this method marked a significant improvement in non-staining ability over other prior-art silicone sealants, there exists a need for good shelf stability during product distribution and for better and longer lasting non-staining properties.

SUMMARY OF THE INVENTION

It is therefore an object of the present invention to provide silicone rubber compositions for rubber construction materials which have excellent non-staining properties and outstanding shelf stability.

We have found that, in a silicone rubber composition for use in rubber construction materials which contains dispersed photocatalytically active particles typically made of titanium oxide or zinc oxide, surface-treating the particles with a compound that can easily be deteriorated by the photocatalytic activity under outdoor exposure to ultraviolet light facilitates the removal of moisture without a loss in the activity of the photocatalytically active particles, thus improving the shelf stability of the composition.

We have also discovered that a particularly remarkable degree of improvement in non-staining properties can be achieved by surface treating the photocatalytically active particles together with a non-surface-treated fumed silica having a specific surface of at least 50 $m^2/g$, or by also including in the composition an oil-absorbing filler which is not surface treated and has a dioctyl phthalate (DOP) oil absorption of at least 20 ml/100 g.

Accordingly, the invention provides a silicone rubber composition for use in rubber construction materials, which composition contains dispersed particles having a photocatalytic activity. The particles are surface-treated with a compound that can easily be deteriorated by the photocatalytic activity upon outdoor exposure to ultraviolet light.

DETAILED DESCRIPTION OF THE INVENTION

The silicone composition of the invention typically contains a diorganopolysiloxane as the base polymer, and may be cured by any suitable mechanism. Examples include compositions vulcanized using a known organic peroxide, condensation-curing compositions, platinum-catalyzed addition-curing compositions and radiation-curable compositions.

The diorganopolysiloxane used in the silicone composition is preferably one having the average compositional formula $R_aSiO_{(4-a)/2}$. In the formula, each R group is independently a substituted or unsubstituted $C_{1-12}$, and preferably $C_{1-10}$, monovalent hydrocarbon group selected from among alkyl groups (e.g., methyl, ethyl, propyl, butyl, 2-ethylbutyl, octyl), cycloalkyl groups (e.g., cyclohexyl, cyclopentyl), alkenyl groups (e.g., vinyl, hexenyl, allyl), aryl groups (e.g., phenyl, tolyl, xylyl, naphthyl, diphenyl) aralkyl groups (e.g., benzyl, phenylethyl), any of the foregoing groups in which some or all of the hydrogens bonded to the carbons have been substituted (such as with halogen atoms or cyano), or groups substituted with or containing, for example, amino groups, ether groups (—O—), carbonyl groups (—CO—), carboxyl groups (—COOH) or sulfonyl groups (—$SO_2$—) (e.g., chloromethyl, trifluoropropyl, 2-cyanoethyl, 3-cyanopropyl). The letter a in the above formula is from 1.90 to 2.05.

If the silicone rubber composition is a condensation-curing composition, a diorganopolysiloxane in which both ends of the molecular chain are capped with hydroxyl or organooxy groups is used as the base polymer of the composition. A composition that provides a cured product having good rubber properties and an excellent mechanical strength may be advantageously achieved by the use of a diorganopolysiloxane having a viscosity at 25° C. of at least 25 cs, and preferably from 100 to 1,000,000 cs.

A silane or siloxane compound having at least two hydrolyzable groups per molecule is typically used as the crosslinking agent for the diorganopolysiloxane. Illustrative examples of the hydrolyzable groups include alkoxy groups (e.g., methoxy, ethoxy, butoxy), ketoxime groups (e.g., dimethyl ketoxime groups, methyl ethyl ketoxime groups), acyloxy groups (e.g., acetoxy), alkenyloxy groups (e.g., isopropenyloxy, isobutenyloxy), amino groups (e.g., N-butylamino, N,N-diethylamino), and amide groups (N-methylacetamide groups). The crosslinking agent is typically included in an amount of 2 to 50 parts, and preferably 5 to 20 parts, per 100 parts of the diorganopolysiloxane capped at both ends with hydroxyl or organoxy groups. Unless noted otherwise, all parts here and below are by weight.

A curing catalyst is typically used in the above condensation-curing silicone rubber composition. Illustrative examples of suitable curing catalysts include alkyltin ester compounds such as dibutyltin diacetate, dibutyltin dilaurate and dibutyltin dioctoate; titanic acid ester or titanium chelate compounds such as tetraisopropoxytitanium, tetra-n-butoxytitanium, tetrakis(2-ethylhexoxy)titanium, dipropoxybis(acetyl-acetonato)titanium and titanium isopropoxyoctylene glycol; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate and alkoxyaluminum compounds; aminoalkyl-substituted alkoxysilanes such as 3-aminopropyltriethoxysilane and N-β(aminoethyl)-γ-aminopropyltrimethoxysilane; amine compounds and their salts, such as hexylamine and dodecylamine phosphate; quaternary ammonium salts such as benzyltriethylammonium acetate; lower fatty acid salts of alkali metals, such as potassium acetate, sodium acetate and lithium oxalate; dialkylhydroxylamines such as dimethylhydroxylamine and diethylhydroxylamine; and guanidyl group-bearing silanes or siloxanes, such as tetramethylguanidylpropyltrimethoxysilane, tetramethylguanidylpropylmethyldimethoxysilane and tetramethylguanidylpropyltris(trimethylsiloxy)silane. These catalysts may be used singly or as mixtures of two or more thereof. The curing catalyst is typically included within the composition in an amount of 0 to 10 parts, and preferably 0.01 to 5 parts, per 100 parts of the diorganopolysiloxane.

If the silicone rubber composition of the invention is an addition-curing silicone rubber composition, the organopolysiloxane used as the base polymer is one having at least two alkenyl groups at the ends of the molecular chain and/or at intermediate positions on the chain. It is advantageous for the organopolysiloxane to have a viscosity at 25° C. of 100 to 10,000,000. The crosslinking agent is typically an organohydrogenpolysiloxane having at least two SiH groups per molecule. Any known organohydrogenpoly-siloxane may be used, although one having a viscosity at 25° C. of not more than 300 cs is preferred. This crosslinking agent is generally used in an amount, per mole of alkenyl groups in the organopolysiloxane serving as the base polymer, of 0.3 to 10 moles, and preferably 0.5 to 5 moles. The composition may also include a catalytic amount of curing catalyst. Any suitable known addition reaction catalyst may used for this purpose, although the use of a group VIII metal or compound thereof, and particularly a platinum compound, is preferred. Illustrative examples of such platinum compounds include hexachloroplatinic acid and platinum-olefin complexes.

If the silicone rubber composition is a peroxide-vulcanizable silicone rubber composition, the organopolysiloxane used as the base polymer is preferably one having a viscosity at 25° C. of 100,000 to 10,000,000 cs and bearing a vinyl group at the end of the molecular chain and/or at an intermediate position on the chain. The curing catalyst used in such a composition is an organic peroxide. Preferred examples of the organic peroxide include alkyl organic peroxides such as dicumyl peroxide and di-t-butyl peroxide, and acyl organic peroxides such as benzoyl peroxide and 2,4-dichlorobenzoyl peroxide. The curing catalyst is typically included in an amount of 0.1 to 10 parts, and preferably 0.2 to 5 parts, per 100 parts of the organopolysiloxane.

If the silicone rubber composition is a radiation-curable silicone rubber composition, the diorganopoly-siloxane used as the base polymer is preferably one having an aliphatic unsaturated group (e.g., vinyl, allyl, alkenyloxy, acrylic, methacrylic), a mercapto group, an epoxy group, a hydrosilyl group or some other suitable group at the end of the molecular chain and/or an intermediate position on the chain. Any of the following reaction initiators familiar to the art may be included in such a composition: acetophenone, propiophenone, benzophenone, xanthone, fluorene, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl) ketone, benzyl methoxyketal and 2-chlorothioxanthone. The reaction initiator is added in an amount of typically 0.1 to 20 parts, and preferably 0.5 to 10 parts, per 100 parts of the organopolysiloxane.

The silicone rubber composition of the invention includes particles having a photocatalytic activity. The particles having a photocatalytic activity which are used in the invention are particles with a large enough photocatalytic activity to enable them to decompose organic groups which are present at the surface of the coat and thus make the surface hydrophobic.

These particles having a photocatalytic activity may be made of any material having a high activity as a photocatalyst. Specific examples include photocatalysts such as titanium oxide, zinc oxide, tin oxide, ferric oxide, tungsten trioxide, bismuth trioxide and strontium titanate in which, upon exposure to light of up to a specific wavelength, the electrons in the valence band are excited to the conduction band, enabling the formation of conduction electrons and positive holes. Of the above, titanium oxide and zinc oxide are preferred. Photocatalytic titanium oxide is especially preferred on account of its chemical stability and low cost. The titanium oxides particles may be of any type, although anatase-type titanium oxide is especially preferred for its chemical stability and low cost. Because titanium oxide has a higher photocatalytic activity the smaller its average particle size, the use of titanium oxide having a particle size not larger than 0.1 μm, and preferably 20 nm or smaller is desirable. "Average particle size," as used herein, refers to the value calculated by the Scherrer formula from the integrated width of the largest peak obtained for the crystals in a powder x-ray diffraction pattern of the particles. The titanium oxide particles may be used as a sol prepared by dispersion in a dispersant, as a water- or solvent-containing paste, or as a powder. Preferred examples of the dispersant used to prepare a sol include water, alcohols such as methanol, ethanol, isopropanol, n-butanol and isobutanol, and ketones such as methyl ethyl ketone and methyl isobutyl ketone.

"Photocatalytic titanium oxide," as used herein, refers to titanium oxide with a unit cell structure having a degree of continuous periodicity that enables it to form electrons and positive holes when irradiated with photons of an energy greater than the energy gap, or to such titanium oxide as a bulk material. The crystalline form of the titanium oxide may be anatase, rutile or brookite, for example. So long as the titanium oxide has the above characteristics, it may be in contact or in solid solution with a metal other than titanium. The continuous periodicity of a degree that enables the formation of electrons and positive holes referred to above should be at least of a degree where a maximum peak intensity for the crystals is observable in powder x-ray diffraction performed at 50 kV and 300 mA.

The electrons or positive holes formed by the titanium oxide act on the surface of the cured silicone, rendering the surface hydrophilic. The mechanism is apparently one in which hydroxyl radicals generated in reactions between some of the organic groups on the surface and positive holes and hydroxyl groups react with active oxygen species such as superoxide ions generated in reactions between electrons and oxygen, resulting in the formation of hydroxyl groups on the surface. However, long-term light resistance studies conducted by techniques such as Raman spectroscopy in the course of our research have shown that this reaction arises only in the surface layer upon exposure to ultraviolet light of at least the intensity found in sunlight, and does not take place at the interior of the silicone rubber.

Such photocatalytic titanium oxide can be obtained by a known process, such as that described in JP-A 7-171408, which includes hydrolyzing a titanium compound such as titanyl sulfate, titanyl chloride or a titanium alkoxide under the application of heat, adding an alkali to effect neutralization, vapor-phase oxidation, then calcination or water and heat treatment.

The particles having a photocatalytic activity are added in an amount of 2 to 100 parts, preferably 5 to 40 parts, and most preferably 10 to 30 parts, per 100 parts of the organopolysiloxane component in the silicone rubber composition. The addition of less than 2 parts by weight may fail to confer the surface of the cured product with adequate non-staining properties. On the other hand, the addition of more than 100 parts tends to cause a decline in the non-staining properties (hydrophilicity), in addition to which rubber construction materials (e.g., sealants, coatings, gaskets) made of the cured composition may lack elasticity and have poor sealing properties.

The photocatalytically active particles have a moisture content of preferably 1 wt % or less. At a moisture content higher than 1 wt %, the composition may have a decreased shelf stability. Moreover, when the silicone rubber composition of the invention is used in rubber construction materials such as sealants, coatings and gaskets, if the photocatalytically active particles have a moisture content above 1 wt %, the silicone rubber composition tends to thicken and foam during incorporation of the particles. In addition, foaming may also arise during curing of the composition, and the sealing properties of the composition may decline.

The moisture content of the photocatalytically active particles may be lowered to 1 wt % or less in a number of ways, such as by subjecting the particles themselves to heat or a vacuum to remove moisture therefrom, or by subjecting the silicone rubber composition to heat or a vacuum, either during or after incorporation of the particles. The former approach often fails to provide a sufficient shelf-stabilizing effect in moisture-curable resins, and also tends to increase costs and lower performance. With the latter approach, because treatment is carried out within the organopolysiloxane, the surfaces of the particles become covered with siloxane, lowering their photocatalytic activity.

Thus, the method used in the present invention to remove moisture from the photocatalytically active particles and keep the particles from adsorbing moisture involves incorporating in the photocatalytically active particles a compound that can easily be deteriorated by photocatalytic activity. The use of such a compound makes it possible to surface treat the photocatalytically active particles by subjecting them to heat and vacuum treatment so as to remove moisture. The compound that can easily be deteriorated by photocatalytic activity which is used to surface treat the photocatalytically active particles is a compound which is liquid at room temperature or has a melting point (softening point) and becomes liquid during heat treatment (generally below 200° C.). The compound is not subject to any particular limitation, so long as it is one which can be easily deteriorated by photocatalytic activity. A compound which is liquid at room temperature may or may not have a boiling point, although one having a boiling point preferably boils at a temperature of at least 150° C. under atmospheric pressure. If the compound is one having a melting point (softening point), the melting point (softening point) is preferably not more than 200° C., and most preferably from 50 to 180° C.

Exemplary compounds which can easily be deteriorated by photocatalytic activity include organic oligomers and polymers (e.g., polyethers, silane-modified polyethers, polyesters, polyamides, acrylic compounds, epoxy compounds, phenolic compounds, polyethylene, polypropylene, polyvinyl chloride), as well as mixtures thereof; and high-boiling organic compounds such as wax-type organic compounds (e.g., resin acids, paraffins), saturated hydrocarbon compounds (e.g., isoparaffins), and unsaturated group-bearing hydrocarbon compounds. Of these, polyethers, silane-modified polyethers and isoparaffins are preferred.

The compound which can easily be deteriorated by photocatalytic activity is included in an amount, per 100 parts by weight of the photocatalytically active particles, of preferably 1 to 500 parts, more preferably 5 to 200 parts, and most preferably 10 to 100 parts. Removing moisture in this way makes it possible to improve the shelf stability of the composition and prevent foaming while sustaining or even manifesting increased photocatalytic activity.

The stain resistance can be further enhanced by simultaneously treating both the foregoing particles having photocatalytic activity and a non-surface-treated fumed silica having a specific surface of at least 50 m²/g, and preferably at least 100 m²/g, when carrying out heat and vacuum treatment. In this case, the non-surface-treated fumed silica is typically used in an amount of 0.1 to 100 parts, preferably 0.5 to 20 parts, and most preferably 1 to 10 parts, per 100 parts of the photocatalytically active particles.

Surface treatment of the photocatalytically active particles with the compound which can easily be deteriorated by photocatalytic activity may be carried out by heating and mixing the photocatalytically active particles and the surface treatment compound at room temperature. Specific examples of suitable surface treatment methods include known methods for heating and mixing together polymers and powders, such as methods that involve heating and mixing the above components under stirring and a reduced pressure in a universal mixer, and methods that involve heating and mixing under a reduced pressure using, for example, a twin-shaft continuous kneader, an apparatus sometimes referred as a "slasher" or a colloid mill.

The silicone rubber composition of the invention may optionally include one or more filler other than the above-described photocatalytically active particles for reinforcement or some other purpose. Illustrative examples of fillers commonly used in such silicone rubber compositions include reinforcements such as fired fumed silica, precipitated silica, quartz powder, carbon powder, talc, zeolite and bentonite; fibrous fillers such as asbestos, glass fibers, carbon fibers and organic fibers; and basic fillers such as calcium carbonate, zinc carbonate, magnesium oxide and zeolite. Of these fillers, an oil-adsorbing filler which is not surface treated and has a dioctyl phthalate (DOP) oil absorption of at least 20 ml/100 g, and preferably at least 50 ml/100 g, is desirable because, when used together with the particles having a photocatalytic activity, it can further enhance the stain resistance. Especially preferred examples of such fillers include calcium carbonate and zeolite. No particular limitation is imposed on the amount of filler other than the photocatalytically active particles, although an amount of 1 to 500 parts per 100 parts of the organopolysiloxane component is preferred.

If necessary, various other compounds may be added to the silicone rubber composition of the invention, provided such addition does not compromise the shelf stability or non-staining properties of the composition. Examples of such additional compounds include thixotropic agents composed of polyethylene glycol or derivatives thereof, heat resistance enhancers such as red iron oxide and cerium oxide, cold resistance enhancers, dehydrating agents, rust inhibitors, adhesion improving agents such as γ-aminopropyltriethoxysilane, and liquid reinforcing agents such as network polysiloxane composed of triorganosiloxy units and $SiO_2$ units and/or monoorganosiloxy units.

Photocurable substances (e.g., oligomers and polymers bearing unsaturated groups such as acrylic groups) and photodegradable substances (e.g., tung oil, linseed oil) used in the art may also be added for the purpose of improving the non-staining properties, provided such addition does not compromise the objects of the invention.

The inventive silicone rubber composition for rubber construction materials may be obtained by using a conventional method of preparation to mix given amounts of the above components.

The silicone rubber compositions of the invention can, through curing, be used as rubber construction materials such as sealants, coatings and gaskets. These silicone rubber compositions may be molded and cured using known methods and under known curing conditions that are appropriate for the particular type of composition. The rubber construction materials obtained by curing the inventive compositions, when exposed to ultraviolet light, undergo a hydrophilic change at the surface thereof. Such exposure to ultraviolet irradiation may be from, for example, ultraviolet light in the atmosphere or ultraviolet light emitted by a fluorescent lamp. Alternatively, use can also be made of an ultraviolet light-emitting apparatus such as a UV lamp. A total dose of ultraviolet light of at least 1 $J/cm^2$, and especially at least 2 $J/cm^2$, is preferred.

As described above and demonstrated in the examples that follow, the silicone rubber compositions of the invention have an excellent shelf stability. Moreover, rubber construction materials composed of the inventive compositions in cured form, when irradiated with ultraviolet light, undergo hydrophilization at the surface thereof and thus have excellent non-staining properties. In addition, they have good sealing properties. As a result, when applied as coatings, filled into joints, or used as solid gaskets, they do not cause staining of the building, joints or the area around joints. Moreover, they have excellent weather resistance.

EXAMPLES

Examples of the invention are given below by way of illustration and not by way of limitation. The viscosities indicated below are the values measured at 25° C.

Example 1

Twenty parts of photocatalytic titanium oxide having a moisture content of 0.1 wt % (Tipaque ST-01, produced by Ishihara Sangyo Kaisha, Ltd.) was surface treated with 5 parts of polyoxyethylene polyoxypropylene monobutyl ether (Unilub C, produced by NOF Corporation) in a universal mixer at 100° C. for 2 hours. The following were added to the resulting mixture: 100 parts of dimethylpolysiloxane capped at both ends of the molecular chain with hydroxyl groups and having a viscosity of 5,000 mPa·s, 10 parts of fumed silica surface treated with hexamethyldisilazane and having a specific surface of 200 $m^2/g$, 10 parts of vinyltributanoximesilane, and 1 part of γ-aminopropyltriethoxysilane. These ingredients were blended under reduced pressure to give a specimen 1 in the form of a paste.

Example 2

Aside from using a polyoxypropylene ether capped at both ends with diisopropenoxymethylsilylpropylene groups and having a viscosity of 4,000 mPa·s instead of polyoxyethylene polyoxypropylene monobutyl ether, a paste-like specimen 2 was prepared in the same way as in Example 1.

Example 3

Aside from using a polysiloxane having a polyoxyethylene polyoxypropylene monobutyl ether side chain and a viscosity of 1,700 mPa·s instead of polyoxyethylene polyoxypropylene monobutyl ether, a paste-like specimen 3 was prepared in the same way as in Example 1.

Example 4

Aside from using an isoparaffin (Exxol 130, produced by Exxon Chemical) instead of polyoxyethylene polyoxypropylene monobutyl ether, a paste-like specimen 4 was prepared in the same way as in Example 1.

Example 5

Surface treatment was carried out by mixing 20 parts of photocatalytic titanium oxide having a moisture content of 0.1 wt % (Tipaque ST-01, produced by Ishihara Sangyo Kaisha, Ltd.), 5 parts of polyoxyethylene polyoxypropylene monobutyl ether (Unilub C, produced by NOF Corporation), and 1 part of non-surface-treated fumed silica having a specific surface of 200 $m^2/g$ (Aerosil 200, made by Nippon Aerosil Co., Ltd.) in a universal mixer at 100° C. for 2 hours. The following were added to the resulting mixture: 100 parts of dimethylpolysiloxane capped at both ends of the molecular chain with hydroxyl groups and having a viscosity of 5,000 mPa·s, 10 parts of fumed silica surface treated with hexamethyldisilazane and having a specific surface of 200 $m^2/g$, 10 parts of vinyltributanoximesilane, and 1 part of γ-aminopropyltriethoxysilane. These ingredients were blended under reduced pressure to form a paste-like specimen 5.

Example 6

Twenty parts of photocatalytic titanium oxide having a moisture content of 0.1 wt % (Tipaque ST-01, produced by Ishihara Sangyo Kaisha, Ltd.) was surface treated by mixture with 5 parts of polyoxypropylene ether capped at both ends with diisopropenoxymethylsilylpropylene groups and having a viscosity of 4,000 mPa·s in a universal mixer at 100° C. for 2 hours. The following were added to the resulting mixture: 100 parts of dimethylpolysiloxane capped at both ends of the molecular chain with hydroxyl groups and having a viscosity of 5,000 mPa·s, 50 parts of non-surface-treated colloidal calcium carbonate having a DOP adsorption of 31 ml/100 g, 10 parts of vinyltributanoximesilane, and 1 part of γ-aminopropyltriethoxysilane. These ingredients were blended under reduced pressure to form a paste-like specimen 6.

Comparative Example 1

Twenty parts of photocatalytic titanium oxide having a moisture content of 0.1 wt % (Tipaque ST-01, produced by Ishihara Sangyo Kaisha, Ltd.) was blended under reduced pressure with 100 parts of dimethylpolysiloxane capped at both ends of the molecular chain with hydroxyl groups and having a viscosity of 5,000 mPa·s, 10 parts of fumed silica surface treated with hexamethyldisilazane and having a specific surface of 200 m$^2$/g, 10 parts of vinyltributanoximesilane, and 1 part of γ-aminopropyltriethoxysilane. These ingredients were blended under reduced pressure to form a paste-like specimen 7.

Comparative Example 2

Twenty parts of photocatalytic titanium oxide having a moisture content of 0.1 wt % (Tipaque ST-01, produced by Ishihara Sangyo Kaisha, Ltd.) was surface treated by mixture with 5 parts of dimethylpolysiloxane capped at both ends with trimethylsiloxy groups and having a viscosity of 100 mPa·s (KF96-100, made by Shin-Etsu Chemical Co., Ltd.) in a universal mixer at 100° C. for 2 hours. The following were added to the resulting mixture: 100 parts of dimethylpolysiloxane capped at both ends of the molecular chain with hydroxyl groups and having a viscosity of 5,000 mPa·s, 10 parts of fumed silica surface treated with hexamethyldisilazane and having a specific surface of 200 m$^2$/g, 10 parts of vinyltributanoximesilane, and 1 part of γ-aminopropyltriethoxysilane. These ingredients were blended under reduced pressure to form a paste-like specimen 8.

The organopolysiloxane composition obtained in each of the above examples was applied to a sheet of colorless glass over an area of 30×30 mm and to a thickness of 2 mm, then held for 7 days in a 20° C., 55% relative humidity atmosphere to form a rubber elastomer. The resulting elastomers were then subjected to two years of outdoor exposure. The results obtained are shown in Table 1 below.

TABLE 1

|  | Example | | | | | | Comparative Example | |
|---|---|---|---|---|---|---|---|---|
|  | 1 Spec. 1 | 2 Spec. 2 | 3 Spec. 3 | 4 Spec. 4 | 5 Spec. 5 | 6 Spec. 6 | 1 Spec. 7 | 2 Spec. 8 |
| Resistance to staining under outdoor exposure | | | | | | | | |
| Initial | good | good | good | good | good | good | good | good |
| After 1 yr | good | good | good | good | good | good | poor | poor |
| After 2 yrs | good | good | good | good | good | good | poor | poor |

Good: no staining occurred
Poor: staining occurred

Example 7

Thirty parts of photocatalytic titanium oxide having a moisture content of 0.1 wt % (Tipaque ST-01, produced by Ishihara Sangyo Kaisha, Ltd.) was surface treated by mixture with 5 parts of polyoxyethylene polyoxypropylene monobutyl ether (Unilub C, produced by NOF Corporation) in a universal mixer at 100° C. for 2 hours. The following were added to the resulting mixture: 97.0 parts of dimethylpolysiloxane capped at both ends of the molecular chain with vinyl groups and having a viscosity of 3,000 cs, 3.0 parts of SiH group-bearing dimethylpolysiloxane having a viscosity of 20 cs, and an isopropanol solution of hexachloroplatinic acid in an amount containing 50 ppm of platinum based on the overall siloxane. The ingredients were mixed to form a liquid specimen 9, which was then cured at 20° C. for 24 hours, yielding a 50×30×210 mm gasket.

Example 8

Thirty parts of photocatalytic titanium oxide having a moisture content of 0.1 wt % (Tipaque ST-01, produced by Ishihara Sangyo Kaisha, Ltd.) was surface treated by mixture with 5 parts of polyoxyethylene polyoxypropylene monobutyl ether (Unilub C, produced by NOF Corporation) in a universal mixer at 100° C. for 2 hours. The following were added to the resulting mixture: 100.0 parts of a polysiloxane capped at both ends of the molecular chain with trimethylsilyl groups, having a viscosity of 100,000 cs, and containing 94.5 mol % of dimethylsiloxane units, 0.5 mol % of methylvinylsiloxane units, and 5 mol % of diphenylsiloxane units, and 0.5 part of dicumyl peroxide. The ingredients were mixed to form a liquid specimen 10, which was then molded under pressure at 180° C. for 10 minutes to yield a 50×30×210 mm gasket.

Example 9

Thirty parts of photocatalytic titanium oxide having a moisture content of 0.1 wt % (Tipaque ST-01, produced by Ishihara Sangyo Kaisha, Ltd.) was surface treated by mixture with 5 parts of polyoxyethylene polyoxypropylene monobutyl ether (Unilub C, produced by NOF Corporation) in a universal mixer at 100° C. for 2 hours. The following were added to the resulting mixture: 100.0 parts of a dimethylsiloxane capped at both ends of the molecular chain with bis(acryloxymethyl-dimethylsiloxy)methylsilyl groups and having a viscosity of 3,000 cs, and 3.0 parts of diethoxyacetophenone. The ingredients were mixed to form a liquid specimen 11. The specimen 11 was irradiated three times with a single high-pressure mercury vapor lamp (80 W/cm) at a distance of 10 cm and a conveyor speed of 1 m/min, yielding a 50×30×210 cm gasket.

The cured products obtained in above examples 7 to 9 were rendered into 30×30×1 mm thick samples, which were bolted onto a sheet of colorless glass and subjected to two years of outdoor exposure. The results obtained are shown in Table 2 below.

TABLE 2

|  | Example 7 Specimen 9 | Example 8 Specimen 10 | Example 9 Specimen 11 |
|---|---|---|---|
| Resistance to staining under outdoor exposure |  |  |  |
| Initial | good | good | good |
| After 1 yr | good | good | good |
| After 2 yrs | good | good | good |

Good: no staining occurred
Poor: staining occurred

Example 10

Twenty parts of photocatalytic titanium oxide having a moisture content of 0.1 wt % (Tipaque ST-01, produced by Ishihara Sangyo Kaisha, Ltd.) was surface treated by mixture with 5 parts of polyoxyethylene polyoxypropylene monobutyl ether (Unilub C, produced by NOF Corporation) in a universal mixer at 100° C. for 2 hours. The following were added to the resulting mixture: 100.0 parts of a dimethylpolysiloxane capped at both ends of the molecular chain with trimethoxysilyl groups and having a viscosity of 8,000 cs, 10 parts of fumed silica surface treated with hexamethyldisilazane and having a specific surface of 200 $m^2/g$, 6 parts of methyltrimethoxysilane, 0.2 part of dioctyltin dilaurate, and 1 part of γ-aminopropyltrimethoxy-silane. These ingredients were blended under reduced pressure to form a paste-like specimen 12.

Example 11

Twenty parts of photocatalytic titanium oxide having a moisture content of 0.1 wt % (Tipaque ST-01, produced by Ishihara Sangyo Kaisha, Ltd.) was surface treated by mixture with 5 parts of polyoxyethylene polyoxypropylene monobutyl ether (Unilub C, produced by NOF Corporation) in a universal mixer at 100° C. for 2 hours. The following were added to the resulting mixture: 100.0 parts of a dimethylpolysiloxane capped at both ends of the molecular chain with hydroxyl groups, containing 10 mol % of pendant vinyl groups and having a viscosity of 20,000 mPa·s, 10 parts of fumed silica surface treated with dimethyldichlorosilane and having a specific surface of 120 $m^2/g$, 10 parts of methyltri-butanoximesilane, 0.2 part of dioctyltin dilaurate, and 1 part of γ-aminopropyltrimethoxysilane. These ingredients were blended under reduced pressure to form a paste-like specimen 13.

Example 12

Twenty parts of photocatalytic titanium oxide having a moisture content of 0.1 wt % (Tipaque ST-01, produced by Ishihara Sangyo Kaisha, Ltd.) was surface treated by mixture with 5 parts of polyoxyethylene polyoxypropylene monobutyl ether (Unilub C, produced by NOF Corporation) in a universal mixer at 100° C. for 2 hours. The following were added to the resulting mixture: 100.0 parts of a dimethylpolysiloxane capped at both ends of the molecular chain with hydroxyl groups, containing 10 mol % of pendant ethoxypropyl groups and having a viscosity of 20,000 mPa·s, 10 parts of fumed silica surface treated with dimethyldichlorosilane and having a specific surface of 120 $m^2/g$, 10 parts of methyltributanoximesilane, 0.2 part of dioctyltin dilaurate, and 1 part of γ-aminopropyltrimethoxysilane. These ingredients were blended under reduced pressure to form a paste-like specimen 14.

The organopolysiloxane composition obtained in each of above examples 10 to 12 was applied to a sheet of colorless glass over an area of 30×30 and to a thickness of 2 mm, then held for 7 days in a 20° C., 55% relative humidity atmosphere to form a rubber elastomer. The resulting elastomers were then subjected to two years of outdoor exposure. The results obtained are shown in Table 3 below.

TABLE 3

|  | Example 10 Specimen 12 | Example 11 Specimen 13 | Example 12 Specimen 14 |
|---|---|---|---|
| Resistance to staining under outdoor exposure |  |  |  |
| Initial | good | good | good |
| After 1 yr | good | good | good |
| After 2 yrs | good | good | good |

Good: no staining occurred
Poor: staining occurred

Japanese Patent Application No. 2001-309747 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A silicone rubber composition for use in rubber construction materials, said composition comprising non-surface-treated fumed silica having a specific surface area of at least 50 $m^2/g$ and dispersed particles having photocatalytic activity, which catalytically active particles are surface-treated with a compound that is liquid at room temperature or that becomes liquid during heat treatment below 200° C. and that is deteriorated by photocatalytic activity under outdoor exposure to ultraviolet light.

2. The silicone rubber composition of claim 1 which contains 100 parts by weight of a diorganopolysiloxane as a base polymer and 2 to 100 parts by weight of the photocatalytically active particles.

3. The silicone rubber composition of claim 1, wherein the photocatalytically active particles are made of titanium oxide or zinc oxide.

4. A sealant coating, or gasket comprising the silicone rubber composition of claim 1.

5. The silicon rubber composition of claim 1, wherein the surface treatment compound is selected from the group consisting of polyethers, silane-modified polyethers, polyesters, polyamides, acrylic compounds, epoxy compounds, phenolic compounds, polyethylene, polypropylene, polyvinyl chloride, resin acids, paraffins, and isoparaffins.

6. A silicone rubber composition for use in rubber construction materials, said composition comprising dispersed particles having photocatalytic activity, which particles are surface-treated with a compound that is liquid at room temperature or that becomes liquid during heat treatment below 200° C. and that is deteriorated by photocatalytic activity under outdoor exposure to ultraviolet light, wherein the surface treatment compound is selected from the group consisting of polyethers, silane-modified polyethers, and isoparaffins.

7. A silicone rubber composition for use in rubber construction materials, said composition comprising
an oil-absorbing filler that is not surface treated and that has a dioctyl phthalate (DOP) oil absorption of at least 20 ml/100 g and
dispersed particles having photocatalytic activity, which particles are surface-treated with a compound that is liquid at room temperature or that becomes liquid during heat treatment below 200° C. and that is deteriorated by photocatalytic activity under outdoor exposure to ultraviolet light.

8. A silicone rubber composition for use in rubber construction materials, said composition comprising dispersed particles having photocatalytic activity, which particles are surface-treated with a compound that is liquid at room temperature or that becomes liquid during heat treatment below 200° C. and that is deteriorated by photocatalytic activity under outdoor exposure to ultraviolet light, wherein the photocatalytically active particles have a moisture content of at most 1 weight-%.

9. The silicone rubber composition of any one of claims 1, 6, 7, or 8, which further comprises as a base polymer a diorganopolysiloxane having the average compositional formula $R_a SiO_{(4-a)/2}$ wherein R is independently a $C_{1-12}$ monovalent hydrocarbon group and the letter "a" is a number from 1.90 to 2.05.

* * * * *